(12) United States Patent
Chen et al.

(10) Patent No.: US 10,693,786 B2
(45) Date of Patent: *Jun. 23, 2020

(54) EFFICIENT SIZE REDUCTION OF A BLOOM FILTER

(71) Applicant: International Business Machines Corporation, Armonk, NY (US)

(72) Inventors: Chen Chen, Haifa (IL); Avraham Harpaz, Haifa (IL); Nir Naaman, Haifa (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1200 days.

This patent is subject to a terminal disclaimer.

(21) Appl. No.: 14/952,943

(22) Filed: Nov. 26, 2015

(65) Prior Publication Data
US 2017/0154110 A1 Jun. 1, 2017

(51) Int. Cl.
*H04L 12/743* (2013.01)

(52) U.S. Cl.
CPC ................. *H04L 45/7453* (2013.01)

(58) Field of Classification Search
CPC . H04L 45/7453; G06F 16/325; G06F 16/316; G06F 16/31
USPC ........................................................ 707/754
See application file for complete search history.

(56) References Cited

U.S. PATENT DOCUMENTS

| | | | |
|---|---|---|---|
| 7,627,570 B2 | 12/2009 | Bosloy et al. | |
| 7,702,683 B1* | 4/2010 | Kirshenbaum | G06F 16/152 |
| | | | 707/758 |
| 9,646,035 B1* | 5/2017 | Dickson | G06F 16/2477 |
| 2007/0168550 A1 | 7/2007 | Wang et al. | |
| 2011/0270852 A1* | 11/2011 | Watanabe | G06F 16/2255 |
| | | | 707/754 |
| 2011/0307659 A1* | 12/2011 | Hans | G06F 3/0613 |
| | | | 711/114 |
| 2012/0084459 A1* | 4/2012 | Wu | H04L 45/7453 |
| | | | 709/238 |
| 2013/0268740 A1 | 10/2013 | Holt | |
| 2014/0067830 A1 | 3/2014 | Buhler et al. | |
| 2014/0189215 A1* | 7/2014 | Kang | G11C 11/40603 |
| | | | 711/103 |

(Continued)

OTHER PUBLICATIONS

Yan Qiao, Efficient Data Structures and Protocols With Applications in Space-Time Constrained Systems, University of Florida, 2014, all pages. (Year: 2014).*

(Continued)

*Primary Examiner* — Jay A Morrison
*Assistant Examiner* — Antonio J Caiado
(74) *Attorney, Agent, or Firm* — Ziv Glazberg (57) ABSTRACT

Method, system and product for efficient size reduction of a Bloom filter. The method includes: creating an interleaved Bloom filter based on a Bloom filter, wherein the interleaved Bloom filter is defined so as to have non-sequential cells of the Bloom filter be positioned sequentially, wherein the interleaved Bloom filter interleaves segments of the Bloom filter, wherein a size of the segments is based on an interleaving factor. A reduced size Bloom filter having a number cells below the number of cells of the Bloom filter is computed. The computation includes computing a value of a cell in the reduced size Bloom filter based on two or more values of cells in the interleaved Bloom filter.

12 Claims, 3 Drawing Sheets

(56) References Cited

U.S. PATENT DOCUMENTS

2014/0351273 A1* 11/2014 Yoon ................ G06F 16/33
  707/754

OTHER PUBLICATIONS

Tarkoma et al., Theory and Practice of Bloom Filters for Distributed Systems, TEKES as part of the Future Internet program of TIVIT (Finnish Strategic Centre for Science, Technology and Innovation in the field of ICT), Jan. 24, 2011, all pages. (Year: 2011).*
Mark C. Jeffrey, Understanding and Improving Bloom Filter Configuration for Lazy Address-Set Disambiguation, University of Toronto, 2011, all pages. (Year: 2011).*
Polychroniou et al., Vectorized Bloom Filters for Advanced SIMD Processors, DaMoN'14, Jun. 22-27, 2014, all pages (Year: 2014).*
Jiachen Chen et al., "COPSS: An Efficient Content Oriented Publish/Subscribe System", Architectures for Networking and Communications Systems (ANCS), 2011 Seventh ACM/IEEE Symposium on Date of Conference: Oct. 3-4, 2011, pp. 99-110.

* cited by examiner

EFFICIENT SIZE REDUCTION OF A BLOOM FILTER

TECHNICAL FIELD

The present disclosure relates to Bloom filters in general, and to efficient size modification of a Bloom filter, in particular.

BACKGROUND

A Bloom Filter (BF) is a probabilistic data structure that can represent set membership in an approximate manner. A Bloom filter responds to membership queries without false negatives, but may provide a false positive at a bounded rate. That is, a query to the filter on whether x is in the set is always correct if item x was inserted into the set S, but may err when the item x in not in S (false positive).

A Counting Bloom filter (CBF) is a data structure similar to a Bloom filter, but instead of providing a single bit in each position of the filter, a counter is provided. Using a counter enables not only adding items to the filter, but also removing items therefrom, without having to re-calculate the filter altogether and without potentially creating false negative in view of a deletion.

BRIEF SUMMARY

One exemplary embodiment of the disclosed subject matter is a computer-implemented method performed by a processor, the method comprising: obtaining a Bloom filter comprising a number of cells; creating an interleaved Bloom filter, wherein the interleaved Bloom filter is defined so as to have non-sequential cells of the Bloom filter be positioned sequentially, wherein the interleaved Bloom filter interleaves segments of the Bloom filter, wherein a size of the segments is based on an interleaving factor; computing a reduced size Bloom filter having a number cells below the number of cells of the Bloom filter, wherein said computing comprises computing a value of a cell in the reduced size Bloom filter based on two or more values of cells in the interleaved Bloom filter; and outputting the reduced size Bloom filter.

Another exemplary embodiment of the disclosed subject matter is a computerized apparatus having a processor, the processor being adapted to perform the steps of: obtaining a Bloom filter comprising a number of cells; creating an interleaved Bloom filter, wherein the interleaved Bloom filter is defined so as to have non-sequential cells of the Bloom filter be positioned sequentially, wherein the interleaved Bloom filter interleaves segments of the Bloom filter, wherein a size of the segments is based on an interleaving factor; computing a reduced size Bloom filter having a number cells below the number of cells of the Bloom filter, wherein said computing comprises computing a value of a cell in the reduced size Bloom filter based on two or more values of cells in the interleaved Bloom filter; and outputting the reduced size Bloom filter.

Yet another exemplary embodiment of the disclosed subject matter is a computer program product comprising a computer readable storage medium retaining program instructions, which program instructions when read by a processor, cause the processor to perform a method comprising: obtaining a Bloom filter comprising a number of cells; creating an interleaved Bloom filter, wherein the interleaved Bloom filter is defined so as to have non-sequential cells of the Bloom filter be positioned sequentially, wherein the interleaved Bloom filter interleaves segments of the Bloom filter, wherein a size of the segments is based on an interleaving factor; computing a reduced size Bloom filter having a number cells below the number of cells of the Bloom filter, wherein said computing comprises computing a value of a cell in the reduced size Bloom filter based on two or more values of cells in the interleaved Bloom filter; and outputting the reduced size Bloom filter.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to provide for an efficient manner to modify a size of a Bloom filter.

For ease of explanation, the disclosure below focuses on an embodiment of a publish/subscribe (pub/sub) network in which Bloom filters are created by each server to represent its corresponding lookup table. However, the disclosed subject matter is not limited to such embodiment.

Publish/subscribe (pub/sub) is a communication paradigm allowing users that produce and consume messages to interact in a decoupled fashion. In a broker-based topic-based pub/sub, message producers, also called "publishers", publish their messages on logical channels called "topics". Message consumers, also called "subscribers", subscribe to the topics that are of interest to them, and receive messages published on those topics of choice. Publishers and subscribers are decoupled because they don't need to know the network address of one another, only the topic identifier on top of which they communicate. A cluster of brokers (also referred to as servers) is collectively operating to provide publish-subscribe service to the clients. The cluster of servers forms a unified pub/sub domain. That is, a message published on a given topic by a client connected to one server, should be received by all the clients subscribing to this topic, regardless of the server they are connected to. In order to achieve that a server must forward messages published by local clients (client connected to the server) to the servers that are connected to the subscribing clients. Routing information may be available to each server depicting for each other N−1 servers, which topics are relevant to their subscribers. Once a message is received, the routing information is used to identify to which one or more servers the message should be forwarded.

In view of their compact size, Bloom filters may be used such that each filter represents a list corresponding to a different server. A Bloom filter array of N−1 filters is used by each server to route the message appropriately.

In order to conserve memory and network resources, each Bloom filter may be as small as possible. The size of a Bloom filter may affect the false positive rate based on the number of items it represents. For example, in case of one million items and an error rate of no more than 1% false positive, the BF may need to have approximately 10 bits per item (i.e., 10 million bits). The BF may be transmitted to all server, thereby consuming both network and storage resources. As the BF may be transmitted repeatedly (e.g., every time the list of items it represents is updated; periodically; or the like) and to potentially a large number of servers, a minimal BF size may be desired. Furthermore, each server may store a large number of BFs, such as corresponding to each server of the pub/sub network. For this reason as well, a minimal BF size may be desired.

In some exemplary embodiments, the BF size is not a-priori known as the number of items may change over time. Increasing a size of a BF may require re-computing the BF (e.g., inserting all items to a new, larger, filter), which may be a computationally insensitive task.

One technical solution is to use a Bloom filter of a large, fixed, size as a basis for creating the smaller Bloom filters for distribution. The smaller Bloom filters may be created in a smaller size than the size of the Bloom filter by folding the Bloom filter upon itself, such by performing logical OR operation on bits of the large Bloom filters to derive value of a single bin in the smaller Bloom filter. The smaller size may be a size sufficient to provide for a desired maximal false positive rate. In some exemplary embodiments, the larger Bloom filter may be a CBF, such as a CBF maintained as a proxy of a reference table of a server, whereby items may be deleted efficiently therefrom. Additionally or alternatively, the outcome BF may also by a CBF. However, for ease of explanation and without loss of generality the disclosure focuses on an embodiment in which a CBF is used as the basis for creating smaller-sized BF.

In some exemplary embodiments, the Bloom filter may be divided into segments of an estimated minimal modified size. Cells of the Bloom filter (e.g., bits in case of a Bloom filter, counters in case of a CBF, or the like) of the segments may be interleaved thereby increasing computation efficiency in view of a potentially reduced memory access time. The interleaved cells, which are used to compute a value of a single cell in the outcome BF, may be fetched together (or pre-fetched, depending on the cache line size).

One technical effect of utilizing the disclosed subject matter is to support efficient generation of a small Bloom filter based on a large Bloom filter. Such a technical solution enables to conserve bandwidth and memory resources if Bloom filters are distributed to other devices, such as other servers in a pub/sub network, while potentially adhering to a desired false positive rate or range of desired rates. The disclosed subject matter may be useful in reducing access time and computation time when generating smaller-sized Bloom filters.

Figure 1A:
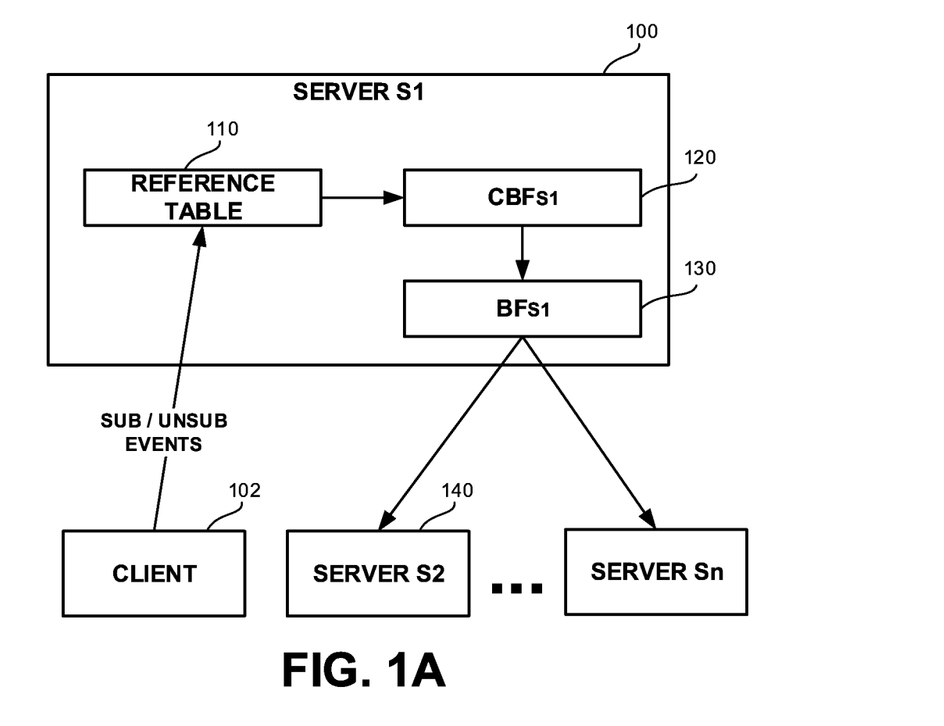
FIG. 1A shows a block diagram of a server, in accordance with the disclosed subject matter.

Referring now FIG. 1A showing a block diagram of a server, in accordance with the disclosed subject matter. Server 100, denoted as S1, may be part of a pub/sub network of N servers, such as S1, S2, . . . , Sn.

Server S1 100 may receive subscription events from client devices, such as Client 102, and may update a Reference Table 110 to indicate which client is subscribed on which topic. In some exemplary embodiments, unsubscribe events may also be received in which a client requests to be removed from a topic subscription. Reference Table 110 may provide a precise lookup table indicating for each topic, a list of client subscribers.

Based on Reference Table 110, Server S1 100 may define an approximated lookup table using a CBF, indicating a set of topics to which clients of Server S1 100 are subscribed. $CBF_{S1}$ 120 may be a counting Bloom filter used as the approximated lookup table. $CBF_{S1}$ 120 may support both addition and removal of topics therefrom without requiring re-computation of the filter.

In some exemplary embodiments, $CBF_{S1}$ 120 may be defined as having a size which is estimated to be large enough so as $CBF_{S1}$ 120 would not need to be enlarged over time when additional topics are added. In some cases, the size may be set as a size that would have at most a predetermined maximal rate of false positive when all topics of the pub/sub network are entered to the filter. In some exemplary embodiments, in case the number of topics is not a-priori known, such number may be estimated. The size may be denoted, for simplicity, as $2^a$.

In some exemplary embodiments, $CBF_{S1}$ 120 may interleave cells of different segments so as to improve memory access efficiency. The segments may be determined based on an estimated maximal folding factor (e.g., by 2, $2^2$, $2^3$, $2^4$, etc.). In some exemplary embodiments, the CBF may be interleaved with an interleaving factor of $2^b$. Using such an interleaved CBF, cells required for computing cell j in a folded BF (or CBF) of a folding factor of $2^c=2^b$, are arranged so as to be located in proximity to one another. In some exemplary embodiments, cells $(j+s \cdot 2^{a-b})$, $s=0 \ldots 2^b-1$ of the CBF are arranged right next to each other in the interleaved CBF at locations $i_{int}=j \cdot (2^b)+s$ for $s=0 \ldots 2^b-1$. In some exemplary embodiments, an interleaved CBF that is defined using an interleaving factor of $2^b$ may support efficient folding of any folding factor $2^c$, where $b \geq c \geq 0$. In some exemplary embodiments, such interleaved CBF may provide for efficient folding to a smaller sized filter having size of at least $2^{(a-b)}$.

In some exemplary embodiments, when a filter is to be distributed to other servers, such as Server S2 140 . . . Server Sn, or the like, a $BF_{S1}$ 130 of a reduced size may be computed and distributed. $BF_{S1}$ 130 may be computed by performing logical folding of $CBF_{S1}$ 120 using a folding factor, such as $2^b$. The reduced size may be a size that is sufficient to provide, for the number of items entered to the filter, a desired maximal false positive rate. As is known in the art, Bloom filter having m cells, using k hash functions, and having n items, may provide a different false positive rate. For example, k=4, m/n=4 provides a false positive ratio of about 0.160. As another example, k=4, m/n=15 provides a ratio of about 0.003. When $BF_{S1}$ 130 is computed, the value of k and n is known and fixed, while the value of m may be minimized to a value which still provides a false positive ratio below a desired threshold.

Figure 1B:
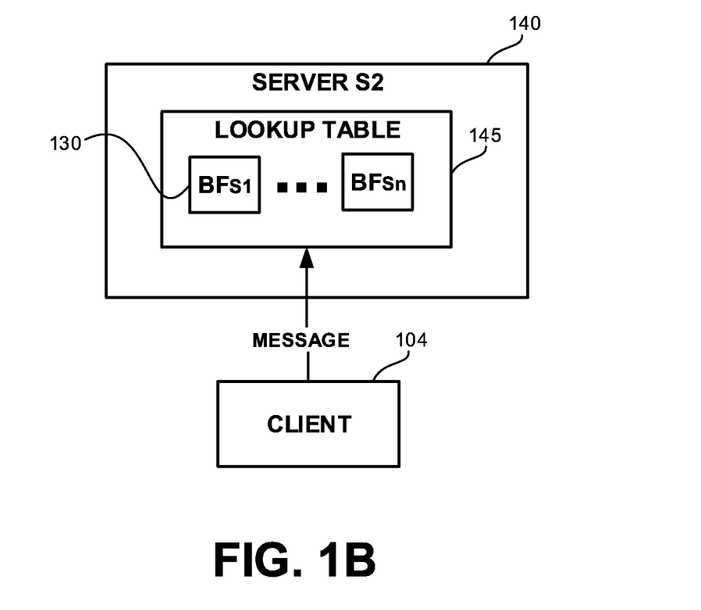
FIG. 1B shows a block diagram of a server, in accordance with the disclosed subject matter.

Referring now to FIG. 1B, showing a block diagram of a server, in accordance with the disclosed subject matter. Server S2 140 retains an approximated lookup table, Lookup Table 145 which is based on Bloom filters. Lookup table may comprise a Bloom Filter for each server: BFS1 130 representing Server S1 130, . . . $BF_{Sn}$ representing Server Sn. In some exemplary embodiments, Server S2 may or may not comprise a BF representing itself. Additionally or alternatively, Server S2 may comprise CBF, similar to $CBF_{S1}$ 120. Additionally or alternatively, Server S2 may comprise Reference Table, similar to 110, so as to provide precise lookup of its subscribers, when needed.

Upon receipt of a message from a client device, Client 104, a topic of the message may be determined. Server S2 may determine which of its direct subscribers are subscribed to the topic, such as based on a reference table (not shown). Additionally or alternatively, Server S2 may determine to which other server the message should be transmitted based on whether the other server has subscribers to the relevant topic. Server S2 may lookup in each BF of Lookup Table 145. If a BF of server Sm returns a positive result, than the message is transmitted to server Sm. Server Sm may identify to which of its direct clients the message is to be transmitted. In some exemplary embodiments, Server Sm may have no such clients at all and the positive result may be an outcome of a false positive error. Server Sm in such a case may drop the message and disregard it.

Figure 2A:
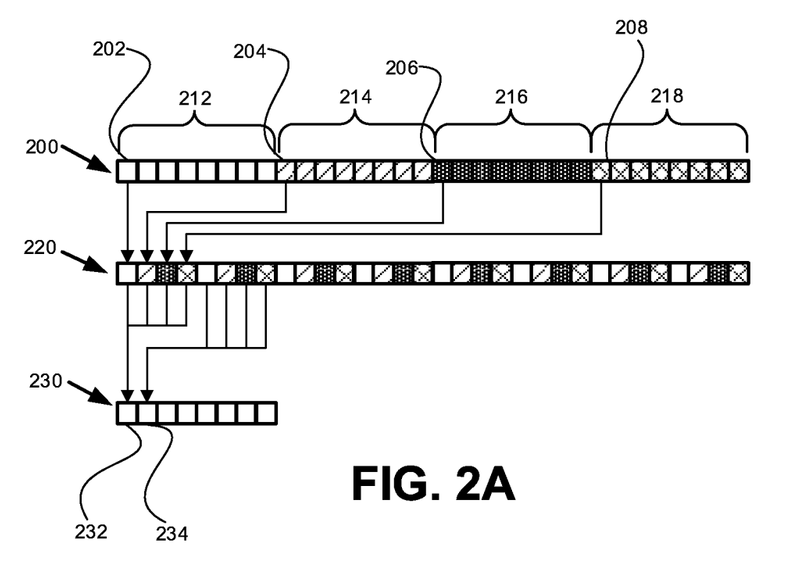
FIG. 2A shows schematic illustrations of Bloom filters, of folding a Bloom filter to a smaller Bloom filter and of interleaving the original Bloom filter to support efficient folding, in accordance with the disclosed subject matter.

Referring now to FIG. 2A showing schematic illustrations of Bloom filters, of folding a Bloom filter to a smaller Bloom filter and of interleaving the original Bloom filter to support efficient folding, in accordance with the disclosed subject matter.

Bloom Filter 200 may be a set of cells. In case of a regular Bloom filter, the cells may be bits. In case of a CBF, the cells may be counters. Each counter may be comprised of a number of bits (e.g., 3-4 bits) used for counting a number of items matching the cell. In some exemplary embodiments, in order to support efficient folding, the size of the BF is rounded to a next power of two. For example, considering a CBF of approximately one million items at 1% false positive error rate. In a regular Bloom filter, such requirement may lead to approximately 10 bits per item, resulting in $10*10^6$ bits (derived from the approximation formula to calculate the number of bits per item as a function of the number of items and false positive rate). In a CBF, each bit of the BF corresponds to a counter, so it may require $10*10^6$ counters of d bits each (e.g., d=4), per item. The size may be accordingly rounded up to $m=2^{24}$.

In addition, as a non-limiting example, there may a family of k hash functions that produce a=24 bits each. For example, K=6. h[k,a] may be used to denote the k-th hash function producing output a bits wide.

In some exemplary embodiments, the BF with $m=2^a$ cells is divided into $2^b$ segments of consecutive cells, so that every segment has $m'=2^{(a-b)}$ cells. In FIG. 2A, Bloom Filter 200 comprises $m=2^5=32$ cells (a=5); and the reduction factor is $2^2=4$ (b=2), hence there are four segments (212, 214, 216, 218), each of which is of size $2^{5-2}=2^3=8$. The number $2^b$ may also be referred to as the folding factor, which is equal to (m/m').

A Reduced Sized Filter, such as 230, may be computed based on disjuncting cells of Bloom Filter 200. Point-wise union of the segments (or point-wise summation, in case of CBFs) may be used to define Reduced Size Filter 230 of size $m'=2^{(a-b)}$, representing the same elements inserted into BF 200, with the corresponding hash function h[k,a-b] being the lower (a-b) bits of h[k,a]. Inserting or removing an element e in to the BF 200, may involve the K counter accesses, into indexes i=h[k,a](e), for k=1 . . . K (increasing or decreasing the counter, respectively). When cell i in BF 200 (denoted $BF_{ORIG}(i)$) changes, the status v of the corresponding cell j of Reduced Size Filter 230 may be calculated as follows:

```
j = i mod 2^(a-b)
set v to false;
For s=0 until (2^b)-1 {
    If (BF_ORIG(j+s*2^(a-b)) > 0)
        set v to true;
}
```

In some exemplary embodiments, based on Bloom Filter 200, a Reduced Size Filter 230 may be computed (each cell thereof is denoted $BF_{REDUCED}(j)$), for example, as follows:

```
For j=1 until 2(a-b)-1 {
    set v to false;
    For s=0 until (2^b)-1 {
        If (BF_ORIG(j+s*2^(a-b)) > 0)
            set v to true;
    }
    BF_REDUCED(j)=v
}
```

As can be appreciated from FIG. 2A, a first Cell 232 of Reduced Size Filter 230 is computed based on the first cells of each segment (Cells 202, 204, 206, 208); the second Cell 234 of Reduced Size Filter 230 is computed based on the second cell of each segment; and so forth.

As can be appreciated, the above may be applied to creating a reduced sized CBF if instead of the disjunction operation, summation is performed so as the counter of cell i in the new CBF would be a summation of the values of the counters in cells $i+s*2^{a+b}$ in the original CBF.

In some exemplary embodiments, computing Reduced Size Filter 230 may require accessing Bloom Filter 200 with a stride of $2^{a-b}$. In order to calculate the respective $BF_{REDUCED}(j)$ cell faster, it may be beneficial to interleave the CBF with an interleaving factor of $2^b$, so that cells $(j+s*2^{(a-b)}, s=0 \ldots 2^b-1$, sit right next to each other at locations $i_{int}=j*(2^b)+s$, for $s=0 \ldots 2^b-1$. Interleaved Filter 220 exemplifies interleaving Bloom Filter 200 based on an interleaving factor of $2^2=4$.

Figure 2B:
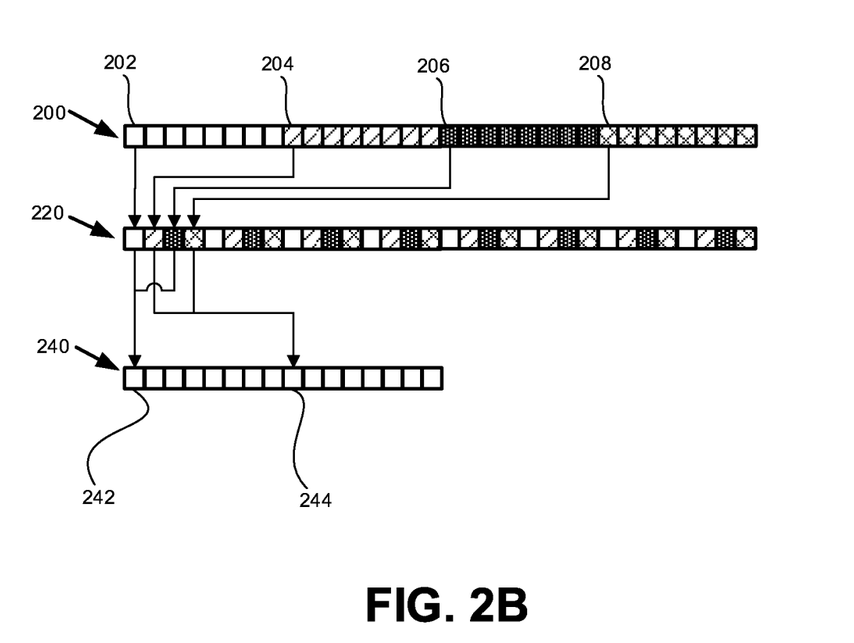
FIG. 2B shows schematic illustrations of using different folding and interleaving factors for folding and for interleaving Bloom filters, in accordance with the disclosed subject matter.

Referring now to FIG. 2B, showing schematic illustrations of Bloom Filters. FIG. 2B exemplifies interleaving Bloom Filter 200 based on an interleaving factor of $2^2=4$ and folding Bloom Filter 200 with a smaller folding factor $2^1=2$ to produce Reduced Size Filter 240.

As can be appreciated in view of the present disclosure, reduced size Bloom filters of size $m'=2^{(a-c)}$, where b>c>=0 ($2^b$ is the interleaving factor; $2^c$ is the folding factor), can also be produced efficiently. In these Bloom filters, any cell j can be produced by accessing $2^c$ cells, that reside in a block of $2^b$ consecutive cells in Bloom Filter 220.

In some exemplary embodiments, the interleaving factor $2^b$ used to interleave Bloom Filter 200 and produce Interleaved Filter 210 may allow efficient update of Bloom filters of sizes from $2^a$ till $2^{(a-b)}$, that is, having a folding factor of 1 till $2^b$.

In some exemplary embodiments, when the hash function causes the update of counter at index i=h[k, a](e) in the non-interleaved Filter 200, and there is an interleaved-CBF with factor $2^b$ (e.g. Interleaved Filter 210), a Reduced Size Filter 240 with folding factor $2^c$, can be produced by employing the following method in order to find the value of bit j in the corresponding filter:

```
Input: an interleaved filter (BF_INT) of size 2^a and interleaving factor 2^b; a
BF folding factor 2^c; where a≥b≥c≥0; Non-interleaved counter index i.
Output: index j of range 2^(a-c), value v of cell BF_REDUCED(j).
   j = i mod 2^(a-c)
   set v to false
   set s to 0;
   while (s<(2^b))
      if (BF_INT(j*(2^b)+s) > 0)
         set v to true; Break;
      s=s+(2^(b-c));
   return j,v
```

In some exemplary embodiments, it may also be possible to create reduced size filter of size smaller than $2^{a-b}$. In some exemplary embodiments, cells needed in order to calculate a single cell in the reduced size filter may not reside in the same segment of $2^b$ cells. As a result, computation of such filters may be associated with higher overhead potentially associated longer memory access times.

Figure 3:
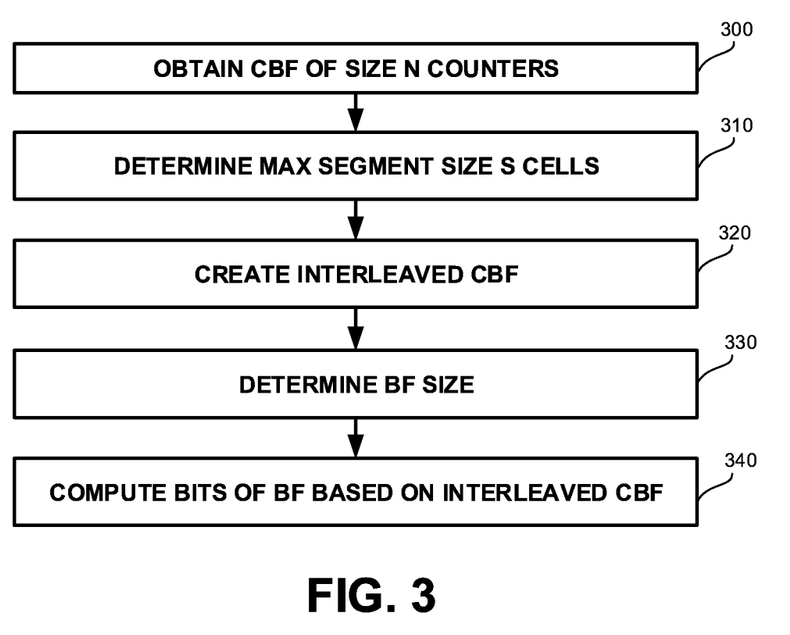
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. FIG. 3 describes an embodiment in which a CBF is to be transformed into a reduced sized (regular, non-counter) BF.

In Step 300, a CBF of Size n counters may be obtained. The number of counters, n, may be of the form $2^a$.

In Step 310, a max segment size s bits may be determined. The max segment size may define an estimated maximal size of a segment for folding operation, in accordance with the disclosed subject matter. The max segment size may be an outcome of an estimated maximal folding factor b, where $s=2^{a-b}$. It will be noted that the max segment size may not limit the maximal folding factor when reducing the size of CBF. However, in accordance with the disclosed subject matter, the computation may be more efficient for reductions that are below or equal to the maximal folding factor.

In Step 320, an interleaved CBF may be created based on the CBF. The interleaved CBF may comprise, in sequence, counters that are non-sequential in the CBF. In some exemplary embodiments, the interleaved CBF may interleave segments of the CBF, wherein each segment may be of the max segment size s.

In Step 330, a size m (m<n) for a reduced size BF may be determined. The size m may be determined so as to ensure that the reduced size BF, comprising a same number of items as the CBF obtained in Step 300, would have a false positive rate below a maximal threshold. In some exemplary embodiments, the reduced size may be $m=2^{a-b'}$, where b' is an interleaving factor.

In Step 340, values of the m bits of a BF of size may be computed, each based on $2^{b'}$ cells of the CBF. In case, b'≤b, the $2^{b'}$ cells may be arranged in sequence and therefore may be more efficiently retrieved using the cache mechanism. In case b'>b, only a subset of b the counters are arranged in sequence, the remainder may be arranged in one or more groups of consecutive counters, potentially improving memory access as well in comparison to a non-interleaved filter in which non-sequential counters are accessed.

Figure 4:
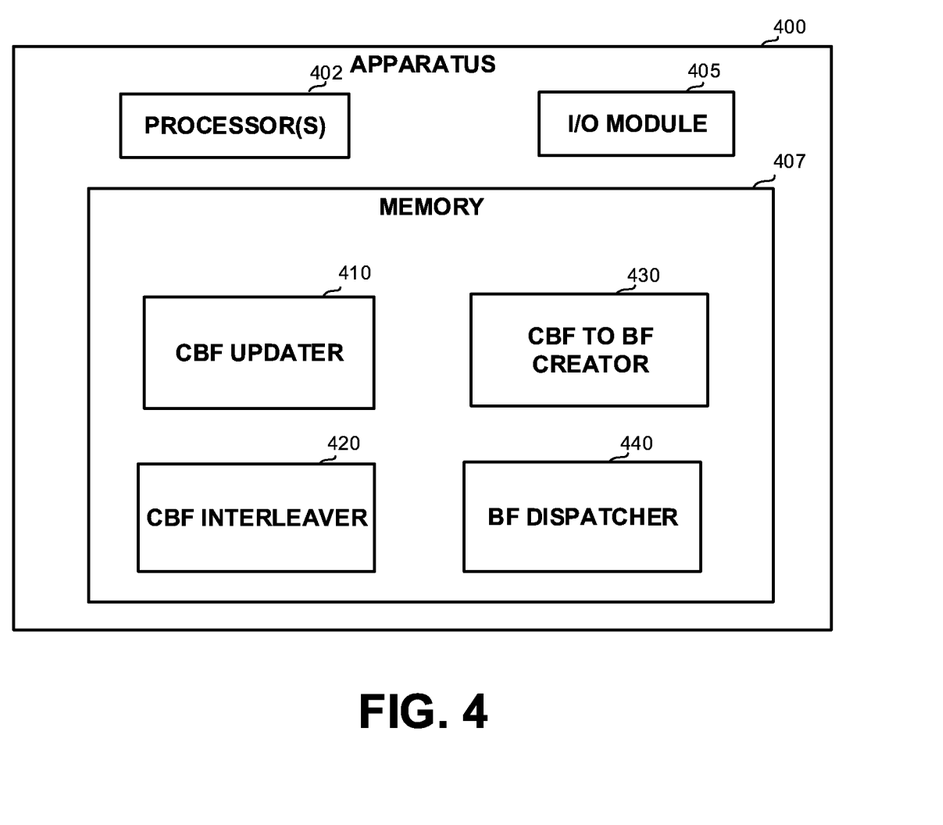
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter. An Apparatus 400 may be configured to generate and dispatch a BF based on a locally retained CBF.

In some exemplary embodiments, Apparatus 400 may comprise one or more processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) Module 405. I/O Module 405 may be utilized to provide output to and receive input from a user or another Apparatus 400 in communication therewith.

In some exemplary embodiments, Apparatus 400 may comprise a Memory 407. Memory 407 may be a hard disk drive, a Flash disk, a Random Access Memory (RAM), a memory chip, or the like. In some exemplary embodiments, Memory 407 may comprise a cache memory (not shown) that provides faster access to data retained in cache lines. In some exemplary embodiments, Memory 407 may retain program code operative to cause Processor(s) 402 to perform acts associated with any of the subcomponents of Apparatus 400.

CBF Updater 410 may be configured to maintain a CBF having a large and fixed size. While the size of CBF may be enlarged from time to time, such an operation may be performed rarely so as to avoid requiring re-computation of the filter. CBF Updater 410 may update the CBF by adding items to the filter and by removing items from the filter.

CBF Interleaver 420 may be configured to create an interleaved CBF. In some exemplary embodiments, the Interleaved CBF may be generated in an initial stage, and CBF Updater 410 may update the interleaved CBF. Additionally or alternatively, the interleaved CBF may be created based on an existing CBF which encodes one or more items therein.

CBF to BF Creator 430 may be configured to create a BF based on a CBF. The BF may be of smaller size than the CBF, such as a minimal size sufficient to provide a false positive rate below a threshold. CBF to BF Creator 430 may be configured to fold the CBF to two or more segments thereby to efficiently compute the BF without having to re-encode the items of the CBF in the BF. The computed BF may use a hash function family that is based on the hash function family of the CBF, such the same hash function family and using a portion of their result (e.g., using the modulo operation).

BF Dispatcher 440 may be configured to dispatch the BF created by CBF to BF Creator 430 to one or more additional servers or devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a processor, the method comprising:
   obtaining a Bloom filter comprising a total number of bits to represent a number of cells, wherein the Bloom filter represents a set of elements;
   creating an interleaved Bloom filter, wherein the interleaved Bloom filter is defined to have non-sequential cells of the Bloom filter be positioned sequentially, wherein the interleaved Bloom filter interleaves segments of the Bloom filter, wherein a size of the segments is based on an interleaving factor; and
   computing a reduced size Bloom filter comprising a reduced total number of bits to represent a reduced number of cells, wherein the reduced number of cells is below the number of cells of the Bloom filter, wherein the reduced total number of bits is smaller than the total number of bits, wherein the reduced size Bloom filter represents the set of elements and wherein the reduced size Bloom filter is reduced by a determined folding factor, wherein said folding factor is smaller than or equal to the interleaving factor, wherein said computing comprises computing a value of a cell in the reduced size Bloom filter based on two or more values of cells in the interleaved Bloom filter, wherein the values of cells are of cells which are comprised by a set of consecutive cells in the interleaved Bloom filter, each of which cells is associated with a different segment of the segments of the Bloom filter, wherein all elements represented by the Bloom filter are represented by the reduced size Bloom filter; and
   outputting the reduced size Bloom filter.

2. The computer-implemented method of claim 1, wherein the Bloom filter is a Counting Bloom filter.

3. The computer-implemented method of claim 1, further comprising determining the interleaving factor, wherein said determining the interleaving factor comprises:
   determining a number of items in the Bloom filter;
   determining a minimal number of cells in a Bloom filter that provide for the number of items a false positive rate below a threshold; and
   determining the interleaving factor based on the minimal number of cells.

4. The computer-implemented method of claim 1,
   wherein the Bloom filter is a Counting Bloom filter representing a set of topics subscriptions in a server;
   the method further comprises, in response to determining to distribute information in the Bloom filter, performing said computing the reduced size Bloom filter and distributing the reduced size Bloom filter to other servers.

5. A computerized apparatus having a processor, the processor being adapted to perform the steps of:
   obtaining a Bloom filter comprising a total number of bits to represent a number of cells, wherein the Bloom filter represents a set of elements;
   creating an interleaved Bloom filter, wherein the interleaved Bloom filter is defined so as to have non-sequential cells of the Bloom filter be positioned sequentially, wherein the interleaved Bloom filter interleaves segments of the Bloom filter, wherein a size of the segments is based on an interleaving factor;
   computing a reduced size Bloom filter comprising a reduced total number of bits to represent a reduced number of cells, wherein the reduced number of cells is below the number of cells of the Bloom filter, wherein the reduced total number of bits is smaller than the total number of bits, wherein the reduced size Bloom filter represents the set of elements and wherein the reduced size Bloom filter is reduced by a determined folding factor, wherein said folding factor is smaller than or equal to the interleaving factor, wherein said computing comprises computing a value of a cell in the reduced size Bloom filter based on two or more values of cells in the interleaved Bloom filter, wherein the values of cells are of cells which are comprised by a set of consecutive cells in the interleaved Bloom filter, each of which cells is associated with a different segment of the segments of the Bloom filter, wherein all elements represented by the Bloom filter are represented by the reduced size Bloom filter; and
   outputting the reduced size Bloom filter.

6. The computerized apparatus of claim 5, wherein the Bloom filter is a Counting Bloom filter.

7. The computerized apparatus of claim 5, wherein the processor is further adapted to perform: determining the interleaving factor, wherein said determining the interleaving factor comprises:
   determining a number of items in the Bloom filter;
   determining a minimal number of cells in a Bloom filter that provide for the number of items a false positive rate below a threshold; and
   determining the interleaving factor based on the minimal number of cells.

8. The computerized apparatus of claim 5,
   wherein the Bloom filter is a Counting Bloom filter representing a set of topics subscriptions in a server; and
   wherein the processor is further adapted to perform: in response to determining to distribute information in the Bloom filter, performing said computing the reduced size Bloom filter and distributing the reduced size Bloom filter to other servers.

9. A computer program product comprising a computer readable storage medium retaining program instructions, which program instructions when read by a processor, cause the processor to perform a method comprising:
   obtaining a Bloom filter comprising a total number of bits to represent a number of cells, wherein the Bloom filter represents a set of elements;
   creating an interleaved Bloom filter, wherein the interleaved Bloom filter is defined to have non-sequential cells of the Bloom filter be postinioned sequentially, wherein the interleaved Bloom filter interleaves segments of the Bloom filter, wherein a size of the segments is based on an interleaving factor;
   computing a reduced size Bloom filtr comprising a reduced total number of bits to represent a reduced number of ells wherein the reduced number of cells is below the number of cells of the Bloom filter, wherein the reduced total number of bits is smaller than the total number of bits, wherein the reduced size Bloom filter represents the set of elements and wherein the reduced size Bloom filter is reduced by a determined folding factor, wherein said folding factor is smaller than or equal to the interleaving factor, wherein said computing comprises computing a value of a cell in the reduced size Bloom filter based on two or more values of cells in the interleaved Bloom filter, wherein the values of cells are of cells which are comprised by a set of consecutive cells in the interleaved Bloom filter, each of which cells is associated with a different segment of the segments of the Bloom filter, wherein all elemenst represented by the Bloom filter are represented by the reduced size Bloom filter; and outputting the reduced sized Bloom filter.

10. The computer program product of claim 9, wherein the Bloom filter is a Counting Bloom filter.

11. The computer program product of claim 9, wherein the program instructions when read by a processor, cause the processor to further perform: determining the interleaving factor, wherein said determining the interleaving factor comprises:

- determining a number of items in the Bloom filter;
- determining a minimal number of cells in a Bloom filter that provide for the number of items a false positive rate below a threshold; and
- determining the interleaving factor based on the minimal number of cells.

12. The computer program product of claim 9,

- wherein the Bloom filter is a Counting Bloom filter representing a set of topics subscriptions in a server;
- wherein the program instructions when read by a processor, cause the processor to further perform: in response to determining to distribute information in the Bloom filter, performing said computing the reduced size Bloom filter and distributing the reduced size Bloom filter to other servers.

* * * * *